United States Patent [19]
Kubota et al.

[11] Patent Number: 5,878,187
[45] Date of Patent: Mar. 2, 1999

[54] DIGITAL SIGNAL RECORDING METHOD AND RECORDING APPARATUS THEREOF

[75] Inventors: Yukio Kubota, Kanagawa; Hajime Inoue, Chiba; Keiji Kanota, Kanagawa, all of Japan

[73] Assignee: Sony Corporation, Tokyo, Japan

[21] Appl. No.: 884,753

[22] Filed: Jun. 30, 1997

Related U.S. Application Data

[63] Continuation of Ser. No. 358,880, Dec. 19, 1994, abandoned.

[30] Foreign Application Priority Data

Dec. 29, 1993 [JP] Japan .................................. 5-352902
Dec. 29, 1993 [JP] Japan .................................. 5-352903

[51] Int. Cl.⁶ .................................................. H04N 5/95
[52] U.S. Cl. ............................................ 386/95; 386/124
[58] Field of Search ................................ 386/95, 96, 98, 386/99, 100, 101, 102, 103, 104, 124, 108, 131, 123, 40, 39; 360/20, 48

[56] References Cited

U.S. PATENT DOCUMENTS

| | | | |
|---|---|---|---|
| 5,021,352 | 6/1991 | Yoshimura et al. | 358/343 |
| 5,130,861 | 7/1992 | Suma | 386/95 |
| 5,337,199 | 8/1994 | Arai et al. | 360/8 |
| 5,377,051 | 12/1994 | Lane et al. | 360/33.1 |
| 5,430,579 | 7/1995 | Onishi et al. | 360/9.1 |
| 5,481,412 | 1/1996 | Bannai et al. | 360/18 |
| 5,504,759 | 4/1996 | Inoue et al. | 360/19.1 |

FOREIGN PATENT DOCUMENTS

| | | | |
|---|---|---|---|
| 0 336 424 | 10/1989 | European Pat. Off. | |
| 0619678 | 10/1994 | European Pat. Off. | H04N 5/92 |
| WO 93/10637 | 5/1993 | WIPO | |

OTHER PUBLICATIONS

Electronics & Communications in Japan, Part I –Communications, vol. 76, No. 8, aug. 1993 New York, US, pp. 25–35 XP 000428979; M. Maeda et al, 'FM–FDM Optical CATV System Employing Demand Access Technology, p. 31, col. 2, line 22 –p. 32, col. 1, line 6; figure 6.

18th International Television Symposium and Technical Exhibition. Symposium Record Cable Sessions. Cable C1., 11 Jun. 1993 Montreux (CH), pp. 831–842, XP 000379398 Y. Utsumi et al. 'Optical Fibre Broadcasting System.', p. 838, line 18 –p. 842, line 2; figure 6.

Faulkner, et al., "Multichannel Digital TV Distribution and Local Video Networking," Optical Communication, Fourteenth European Conf. (IEE Conf. Pub. 292), Sep. 14, 1988.

*Primary Examiner*—Thai Tran
*Assistant Examiner*—Aung S. Moe
*Attorney, Agent, or Firm*—Frommer Lawrence & Haug, LLP; William S. Frommer; Dennis M. Smid

[57] ABSTRACT

An input digital signal is recorded on inclined tracks on a magnetic tape. The tape has a length L divided quarterly. A leading portion L/4 is reserved for general data, while the remaining portions are reserved for continuous data. The general and continuous data are recorded as SYNC blocks on different tracks. A number of general data SYNC blocks of one track from a basic unit which is divided into subunits. The general data sub-units are arranged in the same format as the continuous audio data such that the general data is recorded in the same format as the continuous data. The data rates of the input digital signal which includes the general and continuous data are supplied to a mechanism controller which controls a buffer, a frame segmenting circuit and a tape head mechanism according to the data rates of the general and continuous data such that the data is recorded at a standard rate. In the alternative, the data may be recorded at the standard rate by forming the data into packets to be recorded and controlling the number of bytes in the packets.

6 Claims, 13 Drawing Sheets

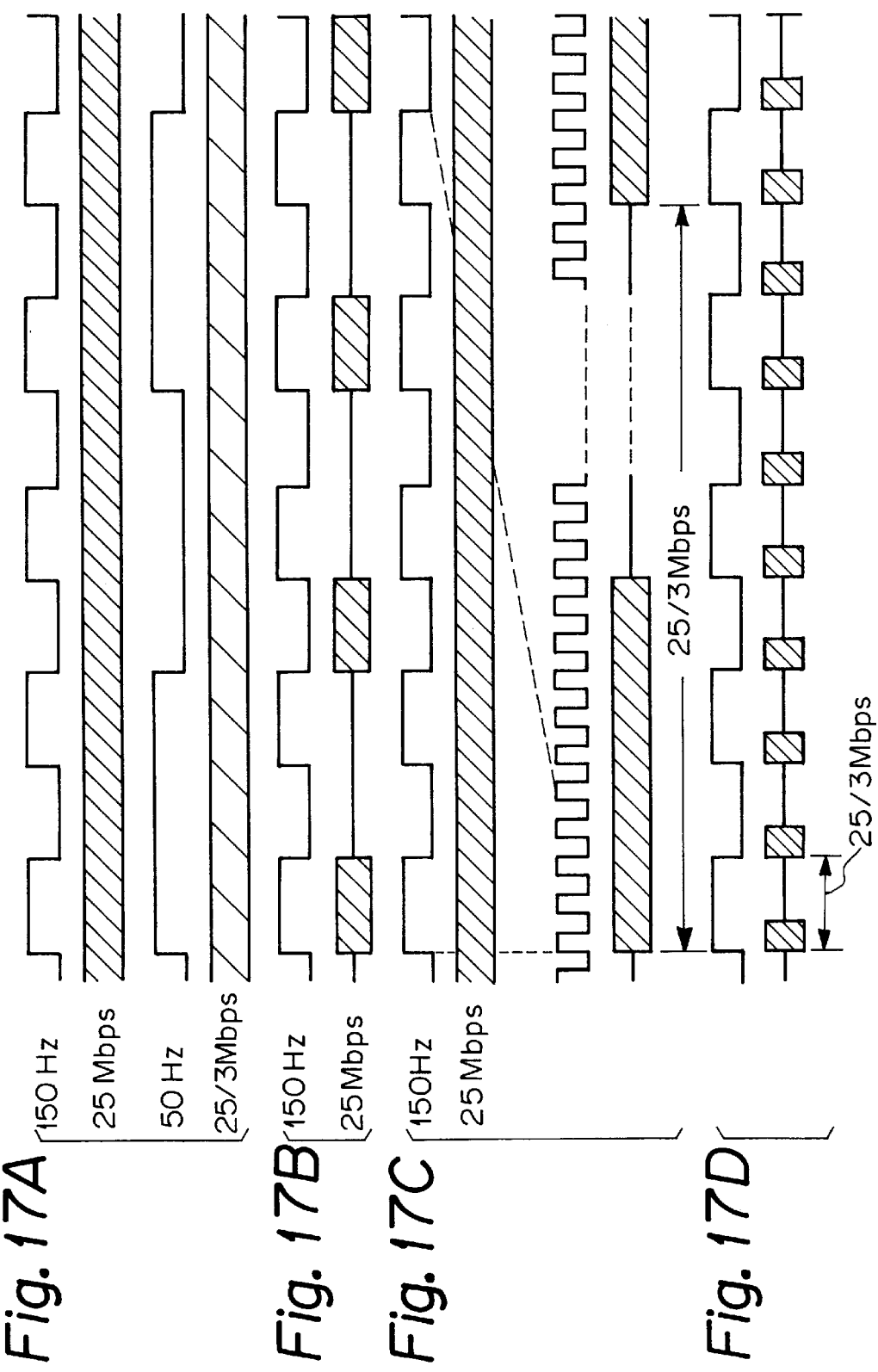

DIGITAL SIGNAL RECORDING METHOD AND RECORDING APPARATUS THEREOF

This application is a continuation of application Ser. No. 08/358,880, filed Dec. 19, 1994, now abandoned.

BACKGROUND OF THE INVENTION

1. Field of the Invention

The present invention relates to a terminal apparatus for use with an image communication system such as a cable TV system.

2. Description of the Related Art

In conventional TV broadcasting systems and cable TV systems (CATV), image signals that are transmitted from broadcasting stations are analogue signals. On the other hand, digital CATV systems that transmit digital image signals have been proposed. An example of CATV system is disclosed in U.S. Pat. No. 5,191,410. The digital CATV systems have been accomplished by the use of highly efficient coding techniques such as DCT (Discrete Cosine Transform) techniques along with improvement of transmission lines and construction of communication network. In other words, with the band for one channel of convention analog image signals, compressed image signals of approximately 10 channels can be transmitted.

The digital CATV systems, which receive and transmit digital image signals, can provide various services and data transmission for not only conventional TV images, but home shopping (electronic mall and electronic banking) and TV games. As various services are provided, information supplied by providers will be specialized.

In such a digital CATV system, even if the data rate of digital signals that are transmitted is constant, depending on the contents of programs, the data rate may vary, program by program. For example, images used for data retrieval are not transmitted as image data with relatively high compression rate and relatively low data rate. On the other hand, when detail information is required for images, the data rate thereof should be high. For still images, the data compression rate can be increased and thereby the data rate can be decreased. In addition, due to various reasons, image data with various data rates may be transmitted.

In the digital image communication systems as with the digital CATV systems, image storage devices are preferably disposed in receiving terminal apparatuses. This is because while the user sees a TV program, since other TV programs can be stored in the image storage device, the user can see the stored programs in his free time. Since digital image signals are stored, the image storage device is preferably a digital cassette tape recorder, a hard disk, a flexible disk, a semiconductor memory, or the like.

The digital cassette tape recorder (hereinafter referred to as digital VCR) performs parity code adding process with error correction code, formatting process, and modulating process and so forth for video signals that have been highly efficiently coded. Thereafter, with a rotating head of the digital cassette tape recorder records the digital video signals on a magnetic tape. In addition, the digital cassette tape recorder performs demodulating process, format decomposing process, error correcting process, and so forth for the signals recorded on the magnetic tape so as to reproduce the digital video signals. Examples of the digital VCR are set forth in EP-A-0553817 and 0574889. In the digital CATV system, when the digital VCR is used as a data storage device, the general data and the continuous data are recorded on the same tape depending on the user's selection or in the received order. However, the general data should be more quickly accessed than the continuous data. If the general data is intermittently recorded on the tape, the data cannot be easily accessed.

In addition, the hardware of the process for the general data is preferably shared with the hardware of the process for the continuous data. For example, the error correction code encoding process, the frame segmenting process that defines the format of data recorded on the tape, and so forth are preferably shared. When such a digital VCR is used for the image storage apparatus, data with variable data rates lower than standard data rate should be recorded and reproduced without wasting the magnetic tape.

In addition, in the digital CATV system, data in which a plurality of program channels have been time-division multiplexed is transmitted. Normally, one of the program channels is selected by a home terminal apparatus so as to see or store the program. However, other program channels cannot be used later.

OBJECTS AND SUMMARY OF THE INVENTION

Thus, an object of the present invention is to provide a digital signal recording method and a recording apparatus for easily accessing the general data when a digital signal to be recorded is continuous to the general data.

Another object of the present invention is to provide a digital signal recording apparatus for causing the data structure of the general data to be the same as the data structure of the continuous data so as to share the process or hardware.

Another object of the present invention is to provide a terminal apparatus for a digital image communication for recording and reproducing data at lower data rates than standard data rate with compatibility of conventional magnetic tapes and least hardware changes without wasting the tapes.

The other object of the present invention is to provide a terminal apparatus for a digital image communication with a storage device that can record data in which multiple channels have been time-division multiplexed at a time so that the user can see all the program channels without restrictions of time.

A first aspect of the present invention is a digital signal recording method for inputting both continuous data such as video data and audio data and general data such as a computer program that is non-continuous data and for recording an input digital signal on a tape-shaped recording medium, comprising the steps of determining that the input digital signal is the general data, determining a general data recording area that is at least one of a leading portion and a trailing portion, the leading portion extending from the leading edge of the tape-shaped recording medium for a predetermined length, the trailing portion extending to the trailing edge of the tape-shaped recording medium for a predetermined length, and storing the general data in the general data recording area, and determining that the input digital signal is the continuous signal, determining a continuous data recording area other than the general data recording area of the tape-shaped recording medium, and recording the continuous data in the continuous data recording area.

A second aspect of the present invention is a digital signal recording apparatus, comprising a first signal process path for inputting both continuous data such as video data and audio data and general data such as a computer program that is non-continuous, demodulating and decoding the input digital signal, and outputting the decoded signal to an output device, a second signal process path disposed downstream of a demodulating means of the first signal process path and adapted for modulating the demodulated signal, encoding the modulated signal with error correction code, and causing a tape head means to record the decoded data to tape-shaped recording medium, a data determining means for determining whether the input digital signal is the general data or the continuous data, and a control means for determining a general data recording area that is at least one of a leading portion and a trailing portion, the leading portion extending from the leading edge of the tape-shaped recording medium for a predetermined length, the trailing portion extending to the trailing edge of the tape-shaped recording medium for a predetermined length, and recording the general data in the general data recording area when the data determining means has determined that the input digital signal is the continuous data and for determining a continuous data recording area other than the general data recording area of the tape-shaped recording medium and recording the continuous data in the continuous data recording area when the data determining means has determined that the input digital signal is the continuous signal.

A third aspect of the present invention is the digital signal recording apparatus of the second aspect, wherein the tape head means is a rotating head for recording the digital signal as inclined tracks on the tape-shaped recording medium, the digital signal being composed of SYNC blocks with a predetermined length, and wherein the general data is recorded in such a manner that the number of the SYNC blocks contained in one of tracks in which the continuous digital signal is recorded is divided into an integer number of basic units and that additional data is placed in each of the basic units.

A fourth aspect of the present invention is a terminal apparatus for a digital image communication, comprising a first signal process path for demodulating and decoding a received signal and sending the resultant signal to an output device, a second signal process path disposed downstream of demodulating means of the first signal process circuit and adapted for modulating the demodulated signal, performing error correction code decoding therefor, and recording the encoded signal on a magnetic medium, a data rate detecting means for detecting data rate of a digital signal supplied from the first signal process path to the second signal process path, and a control means for controlling a recording operation corresponding to the data rate being detected by the data rate detecting means so that a track format on the recording medium almost accords with that at a standard data rate.

A fifth aspect of the present invention is a terminal apparatus, comprising a first signal process path for demodulating and decoding a received signal and sending the resultant signal to an output device, a second signal process path disposed downstream of demodulating means of the first signal process circuit and adapted for modulating the demodulated signal, performing error correction code decoding therefor, and recording the encoded signal on a magnetic medium, and a coupling means for inputting data in which image data of a plurality of program channels has been time-division multiplexed as packets that are composed of a predetermined number of bytes to the first signal process path and recording the time-division multiplexed data to the recording medium.

The above, and other, objects, features and advantage of the present invention will become readily apparent from the following detailed description thereof which is to be read in connection with the accompanying drawings.

BRIEF DESCRIPTION OF THE DRAWINGS

FIGS. 17A, 17B, 17C and 17D are timing charts for explaining several methods for error correction code encoding for the general data;

DETAILED DESCRIPTION OF THE PREFERRED EMBODIMENTS

Figure 1:
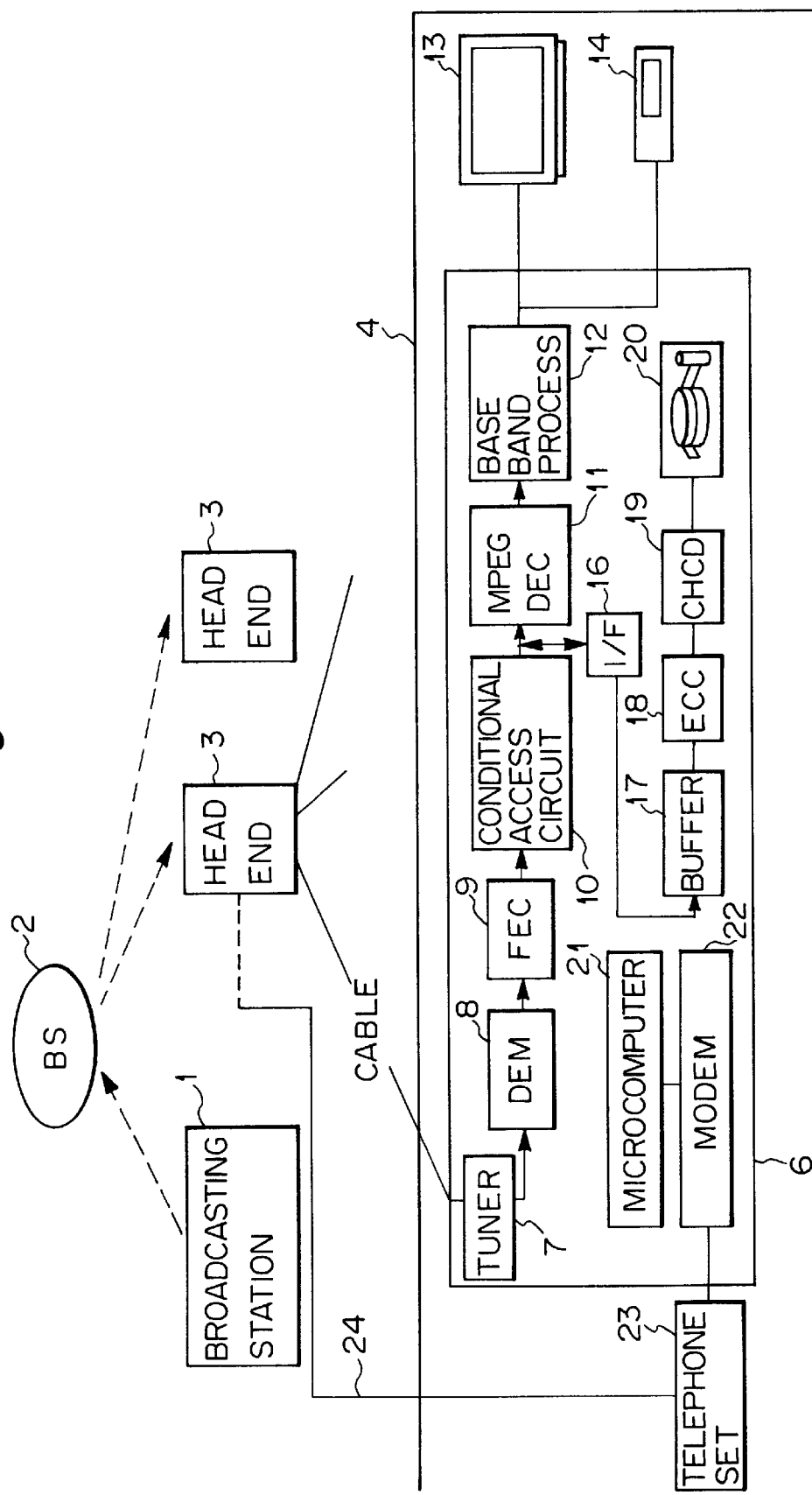
FIG. 1 is a block diagram schematically showing a digital CATV system according to the present invention.

Next, with reference to the accompanying drawings, embodiments of the present invention will be described. FIG. 1 shows an outlined construction of a digital CATV system according to the present invention. Reference numeral 1 is a broadcasting station. The broadcasting station 1 transmits a broadcasting wave to a satellite 2 (broadcasting satellite or communication satellite). Head ends 3 are disposed in individual service areas. Each of the head ends 3 receives the broadcasting wave that is transmitted from the satellite 2. The head end 3 contains an antenna (that receives the broadcasting wave), a receiving amplifier, an image source input portion (when necessary), a modulator (that modulates the received broadcasting wave and image source), a multiplexer (that multiplexes the output of the modulator and outputs the multiplexed signal to a transmission line), and so forth.

The head end 3 and each home 4 are connected by a cable 5. The cable 5 is constructed of either a coaxial cable or an optical fiber or a combination thereof. The cable 5 is connected in a tree shape or in a star shape. The home 4, which is a subscriber of the CATV system, is provided with a terminal apparatus 6. The terminal apparatus 6 contains a tuner 7. With the tuner 7, a desired broadcasting channel is selectively received.

The CATV system according to the present invention is not limited to the CATV system shown in FIG. 1. For example, a plurality of program providers transmit programs to the satellite 2. A CATV station receives broadcasting waves from the satellite 2. The CATV station is connected to the head ends by optical fiber cables. Each head end is connected to many homes by optical fiber cables or coaxial cables. In addition, the present invention may be applied to a digital image communication system (such as TV conference system) other than the digital CATV system.

Figure 2:
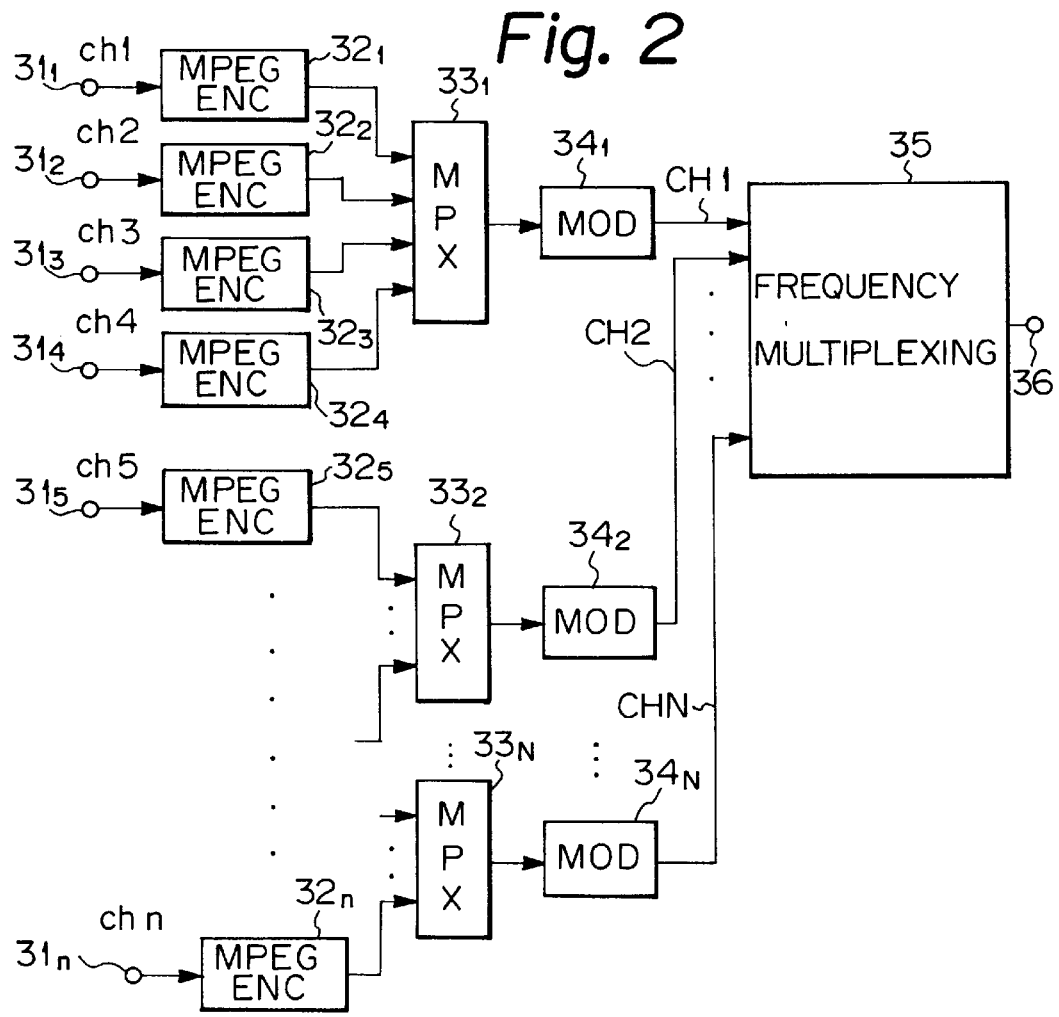
FIG. 2 is a block diagram showing an example of a transmission side of the digital CATV system.

For easy understanding of the present invention, with reference to FIG. 2, the digital broadcasting signal generated in the head end 3 shown in FIG. 1 will be described. Referring to FIG. 2, the digital broadcasting signal contains first to N-th broadcasting channels. Each broadcasting channel contains a plurality of programs (a total of n channels in this example). Reference numerals $31_1$ to $31_n$ are input terminals. The input terminals $31_1$ to $31_n$ are connected to respective image sources. The image sources are not only received through the satellite 2, but generated by the head end 3. The image sources are formed of digital image signals.

The input terminals $31_1$ to $31_n$ are connected to high efficient encoders $32_1$ to $32_n$, respectively. The encoders $32_1$ to $32_n$ accord with for example MPEG (Moving Picture Experts Group) system that has been adopted by ISO (International Organization for Standardization). This image highly efficient coding system is for example motion compensated inter-frame predicting coding technique. Output signals of the MPEG encoders $32_1$ to $32_n$ are supplied to the multiplexer $33_1$. The multiplexer $33_1$ forms time-division multiplexed data of the first broadcasting channel CH1. As shown in FIG. 2, the multiplexers $33_1$ to $33_N$ are disposed corresponding to the number of the broadcasting channels. In the construction shown in FIG. 2, the broadcasting channel CH1 contains for example program channels ch1 to ch4.

Data of each program channel is encoded so that only subscribers of the CATV system can receive the data. The encoding technique normally depends on each program channel.

Figure 3:
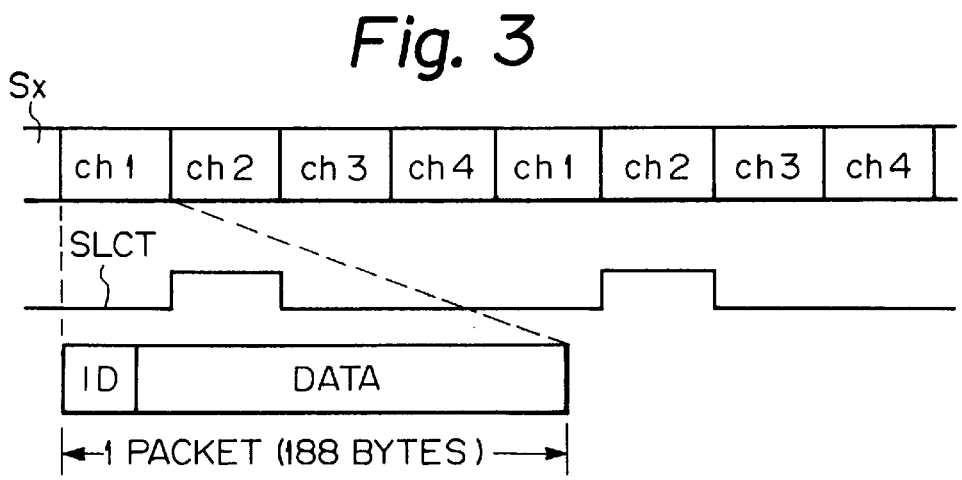
FIG. 3 is a schematic diagram showing an example of transmission data and a selection signal of a program channel.

Each of the multiplexers $33_1$ to $33_N$ time-division multiplexes data of a plurality of program channels. For example, as shown in FIG. 3, the multiplexer $33_1$ generates time-division multiplexed data Sx. FIG. 3 shows a packet that is composed of 188 bytes. Each packet has an ID composed of 4 bytes. The ID is followed by data. On the terminal apparatus side, with a select signal SLCT, a program is selected. The signal level of the select signal SLCT becomes high at a timing of a desired program channel. In FIG. 3, since the data rate of each of the program channels is the same, the number of packets of each of the four channels of the time-division multiplexed signals is the same. The data rate of the time-division multiplexed data has been defined (for example, 25 Mbps).

If the data rate of each channel differs from each other, the number of packets of the time-division multiplexed data correspondingly differs. When the data rate of the channel 1 is twice as high as that of each of other channels 2, 3, and 4, the number of packets of the data of the channel 1 is twice as many as that of each of the channels 2, 3, and 4. The relation of data rate among the channels is not fixed. Instead, when the data rate of each program channel is adaptively controlled, the defined transmission capacity of the transmission line can be effectively used. This process is performed by the multiplexers $33_1$ to $33_N$. This process is referred to as statistical bit allocation.

This process is performed so that the transmission rate available for each broadcasting channel is effectively used. Each program channel itself keeps track of other program channels. When the information amount of a program channel is low, the information amount of another program channel is increased. When the statistical bit allocation is performed, data rate of a program channel varies to some extent.

The ID positioned at the beginning of each packet of time-division multiplexed data contains rate information of the program channel, start information, and so forth. The rate information represents the data rate of the program channel. When the statistical bit allocation process has been performed, since the data rate in the same program channel can be varied, for example, the maximum value of the data rate is placed as rate information in the ID. Instead of the maximum value, information of the average value of the data rate may be placed in the ID. The ID is added by the multiplexers $33_1$ to $33_N$.

Time-division multiplexed data, which are output from the multiplexers $33_1$ to $33_N$, are supplied to digital modulators $34_1$ to $34_N$, respectively. The digital modulators $34_1$ to $34_N$ perform digital modulation such as PSK modulation for the time-division multiplexed data. Carrier frequencies of the digital modulators $34_1$ to $34_N$ vary corresponding to broadcasting channels. The broadcasting signals of the broadcasting channels $CH_1$ to $CH_N$ are multiplexed by a frequency multiplexing circuit 35 and the multiplexed signal is obtained from an output terminal 36.

Returning to FIG. 1, an embodiment of the present invention will be described. With the tuner 7, a broadcasting channel that the user has desired is selected. Thus, a signal of the selected channel is demodulated by a demodulator 8. When the demodulated signal contains an error that has taken place in the communication path, the error is corrected by an error correcting circuit 9. The resultant signal is supplied to a conditional access circuit 10. When the output signal of the error correcting circuit 9 has been encoded (scrambled), the signal is descrambled corresponding to a predetermined condition. In the conditional access circuit 10 or in a circuit downstream thereof, a desired program channel is selected from the time-division multiplexed data. The descrambled signal is supplied to an MPEG decoder 11. In this embodiment, as an encoding technique of image data, the MPEG technique is used. However, highly efficient coding technique other than the MPEG may be used.

Decoded image data that is output from the MPEG decoder 11 is supplied to a base band process circuit 12. The base band process circuit 12 adds a horizontal synchronous signal and a vertical synchronous signal to the decoded image signal. An output signal of the base band process circuit 12 is output to a monitor 13 or a printer 14. The output format of image data that is output from the base band process circuit 12 may be RGB primary color signals, composite color video signals, or transmission format in which a luminance signal is separated from a carrier color signal.

To store received digital image data, a digital VCR is used. The conditional access circuit 10 and the MPED decoder 11 are connected through a signal line 15 and an interface 16 to an image data storage device that includes the digital VCR. The storage device may be connected upstream of the conditional access circuit 10. However, as shown in FIG. 1, when the storage device is connected downstream of the conditional access 10, with visual images, data can be searched in the digital VCR and a cassette tape in which data has been recorded can have compatibility with the standard system.

The image data storage device comprises a buffer memory 17, an error correction code encoder/decoder 18, a channel encoder/decoder 19, and a tape head mechanism portion 20. An input signal of the MPEG decoder 11 is stored in the buffer memory 17 through the interface 16. Thereafter, the encoder/decoder 18 adds a parity of error correction code to the output signal of the buffer memory 17. The channel encoder/decoder 19 modulates an output signal of the encoder/decoder 18. An output signal of the channel encoder/decoder 19, which is record data, is supplied to the tape head mechanism portion 20. The record data is recorded on the magnetic tape by a rotating head.

The tape head mechanism portion 20 comprises a tape guide drum, a tape traveling system, a drive source, and a servo circuit. The magnetic tape is wound around the periphery of the tape guide drum. The tape traveling system travels the magnetic tape along a predetermined traveling path. The drive source is for example a motor that rotates the drum, capstan, and so forth. The servo circuit is used for the drive source. It should be noted that a data storage device such as a hard disk or a magnetic disk may be used along with the digital VCR.

Data reproduced from the magnetic tape by the tape head mechanism portion 20 is decoded by the channel encoder/decoder 19. The encoder/decoder 18 decodes the error correction code. The decoded data is stored in the buffer memory 17. Output data of the buffer memory 17 is supplied to the MPEG decoder 11 through the interface 16 and the signal line 15. Thus, images corresponding to data reproduced by the image storage device are displayed on the monitor 13 or printed out as hard copies by the printer 14.

The terminal apparatus 6 also includes a microcomputer 21 and a modem 22. For example, the microcomputer 22 sends information that represents a desired image to the head end 3 through a telephone set 23 and a telephone line 24. When the CATV system is constructed as a bidirectional system, the terminal apparatus 6 can send a request signal to the head end 3 in the reverse direction of the broadcasting signal.

Figure 4:
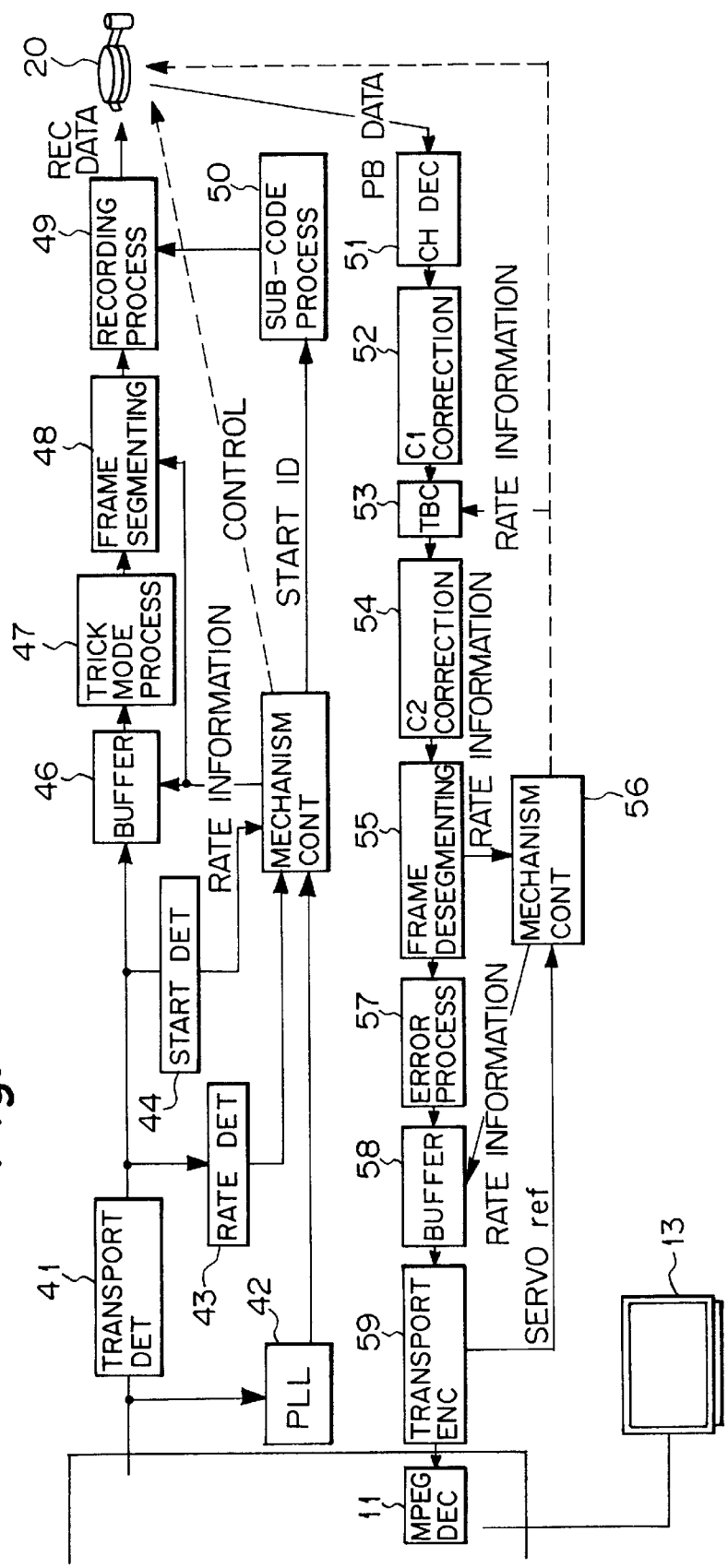
FIG. 4 is a block diagram showing principal portions of an embodiment of the present invention.

FIG. 4 shows a detailed construction of the image signal storage device disposed downstream of the interface 16. An output signal of the conditional access circuit 10 is supplied to both a transport detecting circuit 41 and a PLL 42. The transport detecting circuit 41 decodes packets, each of which is composed of for example 188 bytes. A rate detecting circuit 43 and a start detecting circuit 44 detect information of an ID portion of each packet.

The rate information obtained by the rate detecting circuit 43 represents the compression rate of received video data. The information obtained by the start detecting circuit 44 represents the start position of a program. The PLL 42, which is disposed at an input portion of the terminal apparatus, reproduces a clock when no clock is transmitted through the interface 16.

With the clock reproduced by the PLL 42, a servo reference signal is obtained. The servo reference signal is used to record data. The servo reference signal is supplied to a mechanism controller 45 that is constructed of a microcomputer. Data that has passed through the transport detecting circuit 41 is written to a buffer memory 46 at a timing corresponding to the rate information. The buffer memory 46 reads image data at a timing of the recording system of the digital VCR.

Data that is read from the buffer memory 46 is supplied to a trick mode process circuit 47. The trick mode process circuit 47 reproduces the data, which is read from the buffer memory 46, in a trick mode. An output signal of the trick mode process circuit 47 is supplied to a frame segmenting circuit 48. The trick mode process circuit 47 records compressed image data corresponding to the MPEG system in consideration of the trick mode such as high speed reproduction or slow reproduction. In other words, when the high speed reproduction is performed, the trick mode process circuit 47 records data of an intra-frame on a tracks that the rotating head traces. (In the MPEG system, encoded data of an intra-frame is present every a predetermined number of frames).

The frame segmenting circuit 48 converts compressed video data, PCM audio signal, sub-code, and so forth into data of a predetermined format. The recording format will be described later. The frame segmenting circuit 48 places the rate information, which is detected by the rate detecting circuit 43, in for example an AUX area of a video record area. An output signal of the frame segmenting circuit 48 is supplied to a record process circuit 49. The record process circuit 49 performs error correction code encoding process, a channel modulation process, and so forth. The record process circuit 49 generates record data (for example, at approximately 44 Mbps).

The record data, which is output from the record process circuit 49, is supplied to a head that is fixed on a drum through a rotating transformer (not shown). The head records the data as inclined tracks on the magnetic tape. The mechanism controller 45 controls the tape head mechanism portion 20 corresponding to the data rate of the record data so that a predetermined track pattern and a predetermined track format are obtained on the magnetic tape. The image signal storage device also includes a sub-code process circuit 50. A sub-code that is output from the sub-code process circuit 50 is supplied to the record process circuit 49. The record process circuit 49 records the sub-code at a predetermined sub-code record area of the magnetic tape. A start ID is supplied to a sub-code process circuit 50. The start ID is recorded in the sub-code area. It should be noted that the rate information may be recorded in the sub-code area.

Data reproduced by the tape head mechanism portion 20 is supplied to a channel demodulating circuit 51. The channel demodulating circuit 51 demodulates channel-modulated signal. The channel demodulating circuit 51 is connected to an error correcting circuit 52. The error correcting circuit 52 performs error correction corresponding to error correction code (C1 code). The construction of the error correction code of the digital VCR will be described later. An output signal of the error correcting circuit 52 is supplied to a TBC 53. The TBC 53 removes fluctuated components on time axis. In addition, the TBC 53 supplies data with predetermined data rate, which has been converted corresponding to the rate information received from the mechanism controller 56, to the next stage.

An output signal of the TBC 53 is supplied to an error correcting circuit 54. The error correcting circuit 54 corrects error corresponding to C2 code. Data, in which error has been corrected, is supplied to a frame desegmenting circuit 55. The frame desegmenting circuit 55 separates compressed video data, audio data, sub-code, and so forth. In addition, the frame desegmenting circuit 55 also separates rate information recorded in the video AUX.

The rate information separated by the frame desegmenting circuit 55 is supplied to a mechanism controller 56. With the rate information, the mechanism controller 56 controls the tape head mechanism portion 20 and the TBC 53 corresponding to the received data rate. In addition, with the rate information, the mechanism controller 56 controls a data read address of the buffer memory 58 and a read timing thereof. Reproduced data that is read from the buffer memory 58 is supplied to a transport encoder 59. The transport encoder 59 converts the format of the reproduced data into the format of the received broadcasting signal.

The transport encoder 59 processes the reproduced data so that the MPEG decoder 11 can read it. The processed data is supplied to the MPEG decoder 11. The MPEG decoder 11 restores the original image.

Next, the tape head mechanism portion 20 will be described in detail. For example, a pair of magnetic heads are disposed on the rotating drum at opposed intervals of 180°. On the periphery of the drum, the magnetic tape is wound with a winding angle that is slightly larger or smaller than 180°. Thus, the two magnetic heads are alternatively contacted with the magnetic tape. In addition, the construction in which two magnetic heads are integrally formed on the drum may be used. In this case, the two magnetic heads trace the magnetic tape at a time.

The extended directions of gaps of the magnetic heads against the vertical direction thereof differ from each other. The angles formed between each of the extended directions of the magnetic heads and the vertical directions thereof are referred to as azimuth angles. For example, between the two magnetic heads, azimuth angles of ±20° are set. Thus, adjacent tracks on the magnetic tape are formed by the magnetic heads with different azimuth angles. Consequently, when signals are reproduced, the amount of crosstalk between two adjacent tracks can be reduced.

Figure 5:
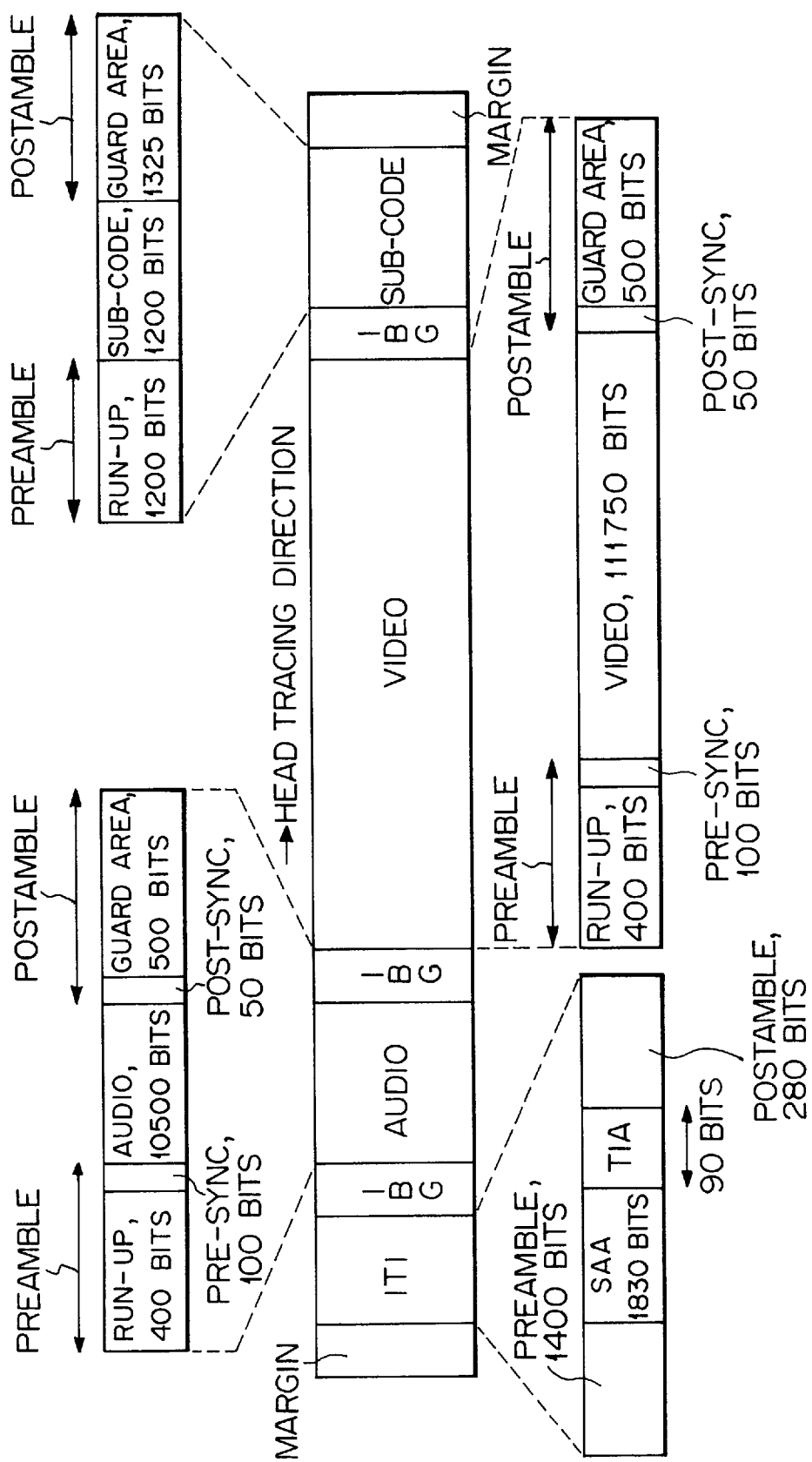
FIG. 5 is a schematic diagram for explaining an example of a track format on a magnetic tape.

Next, the track format of the digital VCR will be described. FIG. 5 shows the arrangement of data that is recorded on one track. In FIG. 5, the left side of the track is the head entering side, whereas the right side of the track is the head leaving side. Data is not recorded at the margin and IBG (inter-block gap).

Next, signals recorded in each area of one track will be described in detail.

(1) ITI Area

As shown in an enlarged portion (lower left) of FIG. 5, the ITI area is constructed of a 1400-bit preamble, a 1830-bit SSA (Start-Sync Block Area), a 90-bit TIA (Track Information Area), and a 280-bit postamble. The preamble has a run-in function for PLL in the reproduction state. The postamble adjusts the margin.

Each of SSA and TIA is constructed of 30-bit SYNC blocks. In each SYNC block, a 10-bit SYNC signal (ITI-SYNC) is followed by a 20-bit data portion. As the content of the data, in the SSA, a sync block number (0 to 60) is recorded. In the TIA, 3-bit APT information, 1-bit record mode (SP/LP) information, and 1-bit pilot frame information are recorded. The 1-bit pilot frame information represents a reference frame of the servo system. The APT is ID data that represents the data construction of a track.

Each sync block in the ITI area is recorded at a predetermined fixed position on the magnetic tape. When the position in which 61-st SYNC signal pattern is detected is defined as an after-record position on the track, the rewrite position in which data is rewritten in the after-record mode is precisely defined and thereby the after-record operation can be properly preformed.

(2) Audio Area

As shown in an enlarged portion (upper left) of FIG. 5, in a record audio area of the PCM audio signal, a preamble and a postamble are formed. The preamble is constructed of a run-up and a pre-SYNC. The run-up pulls the PLL. The pre-SYNC pre-detects the audio SYNC block. The postamble is constructed of a post-SYNC and a guard area. The post-SYNC verifies the end of the audio area. The guard area protects the audio area in the case that after-record operation of video data is performed.

The pre-SYNC is constructed of two SYNC blocks. The post-SYNC is constructed of one SYNC block. At the sixth byte of the pre-SYNC, an SP/LP identification byte is recorded. When the identification byte is FFh, SP mode is identified. When the identification byte is 00h, LP mode is identified. When the SP/LP flag that is recorded in the ITI area is unreadable, the value of the SP/LP identification byte is used. At the sixth byte of the post-SYNC, FFh is recorded as dummy data.

Figure 7:
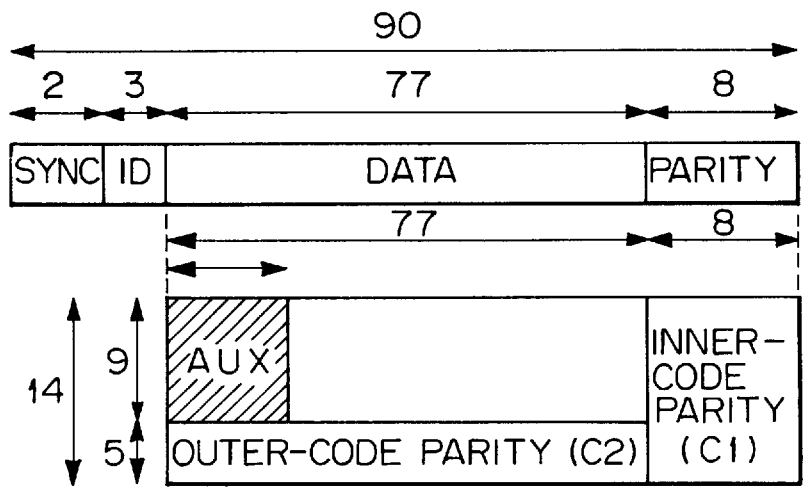
FIG. 7 is a schematic diagram for explaining data construction of audio data.

Audio data that is recorded between the amble areas is framed. In addition, a parity is added to the audio data. FIG. 7 shows the format in which audio data is framed and parity is added thereto.

In FIG. 7, at the beginning of 72-bytes audio data, 5-byte audio additional data (referred to as AUX data) is added and thereby a block of 77-byte data is formed. Nine blocks are vertically formed and then framed. An inner-code parity C1 and an outer-code parity C2 are added to the framed data. In other words, 77 horizontal bytes are encoded corresponding to (85, 77) Reed Solomon code and thereby an 8-byte inner-code parity (C1 parity) is formed. Nine vertical bytes are encoded corresponding to (14, 9) Reed Solomon code and thereby a 5-byte outer-code parity (C2 parity) is formed. Data to which parities are added is read, block by block. At the beginning of each block, a 3-byte ID and 2-byte SYNC signal are added and thereby a 90-byte SYNC block signal shown at an uppermost portion of FIG. 7 is obtained. This 90-byte SYNC block signal is recorded on the magnetic tape.

(3) Video Area

As shown in an enlarge portion (lower right) of FIG. 5, the video area in which a video signal that has been encoded corresponding to the MPEG system is recorded has similar preamble and postamble to those of the audio area.

Figure 6:
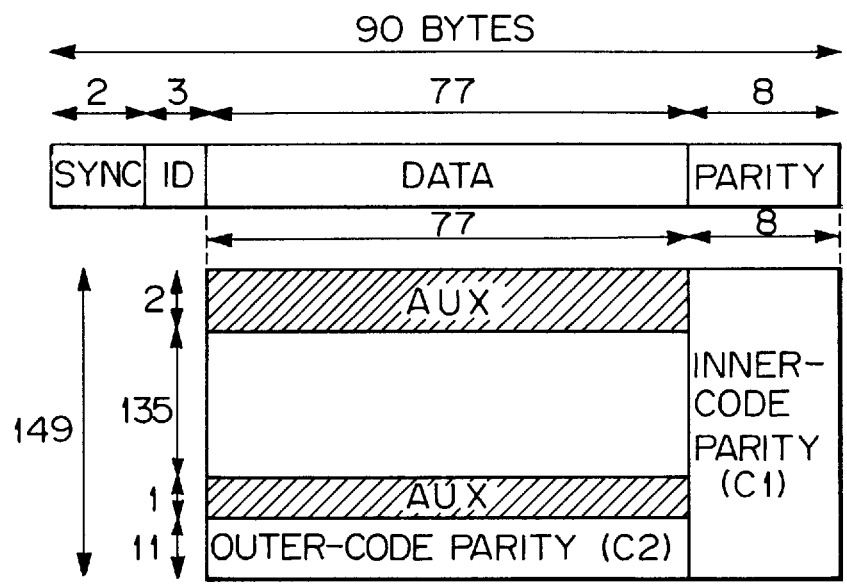
FIG. 6 is a schematic diagram for explaining the data construction of video data.

A video signal for one track and video AUX data for one track are framed by the frame segmenting circuit 48. Thereafter, error correction code is added to the framed data by the record process circuit 49. FIG. 6 shows the format in which data is framed and a parity is added thereto.

As shown in FIG. 6, 135 blocks (5×27) blocks of 77-byte video data are vertically formed. At the upper portion and the lower portion of the 135 blocks, two blocks of video AUX data and one block of video AUX data are placed, respectively. In this embodiment, it is assumed that 30 DCT blocks of data are contained in five SYNC blocks, which are a buffering unit.

77 horizontal bytes are encoded corresponding to (85, 77) Reed Solomon code and thereby an 8-byte inner-code parity (C1 parity) is formed. 138 vertical bytes are encoded corresponding to (249, 138) Reed Solomon code and thereby a 11-byte outer-code parity (C2 parity) is formed. Data with parities is read, block by block. At the beginning of each block, a 3-byte ID and a 2-byte SYNC signal are added and thereby a 90-byte SYNC block signal is formed as shown in an uppermost portion of FIG. 6. This signal is recorded on the magnetic tape.

In the above-described framing format, 27 buffering units that represent video data for one track are data of 810 DCT blocks. Thus, data for one video frame (8100 DCT blocks) is recorded as 10 tracks.

(4) Sub-code Area

Figure 8:
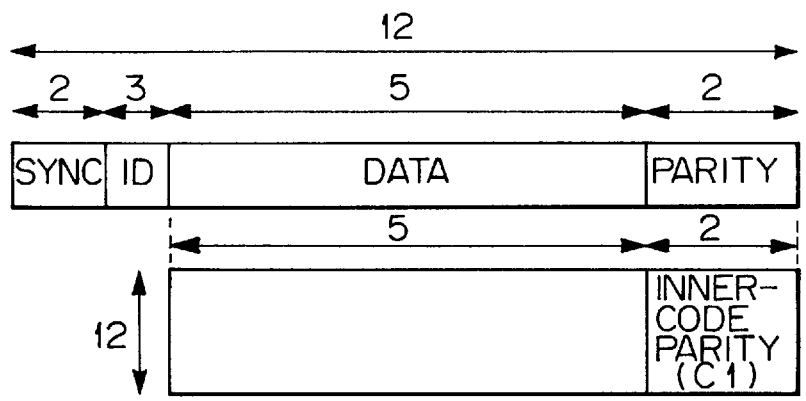
FIG. 8 is a schematic diagram for explaining data construction of sub-code data.

The sub-code area is an area in which information for high speed searching is recorded. The sub-code process circuit 50 generates a sub-code. As shown in FIG. 8, the sub-code area contains 12 SYNC blocks, each of which is composed of 12 bytes. At the beginning of the sub-code area, a preamble is formed. At the end of the sub-code area, a postamble is formed. However, unlike with the audio area and the video area, the sub-code area does not have a pre-SYNC and a post-SYNC. Each of 12 SYNC blocks has a data portion in which a 5-byte sub-code is recorded. As a parity that protects the 5-byte sub-code, (14, 10) Reed Solomon code is used and thereby an inner-code parity C1 is formed.

The record format on the magnetic tape is used to record video data that has been encoded corresponding to the MPEG system, a PCM audio signal, and a sub-code. In the digital CATV system, as well as video data, computer program data and the like (referred to as general data) may be provided. Next, the format for recording and reproducing the general data will be described.

Figure 9:
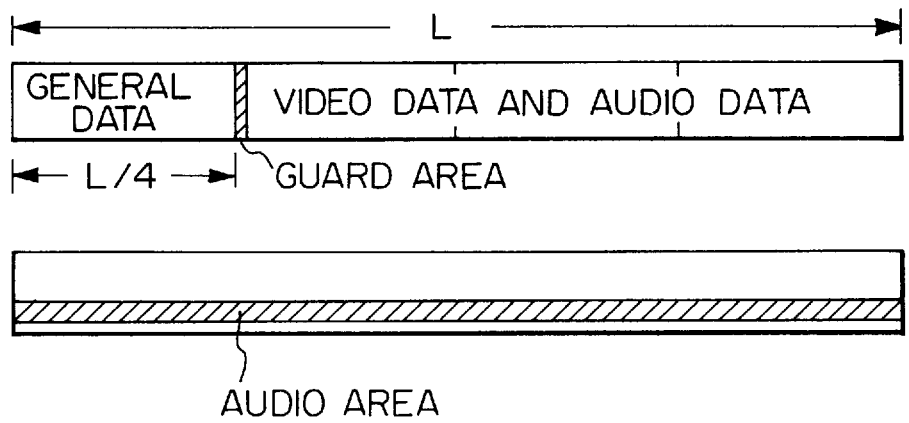
FIG. 9 is a schematic diagram for explaining recording method of general data.

As shown in FIG. 9, the general data is recorded in a first quarter portion (¼ L) of a cassette tape. The general data of for example 2.95 G bytes is recorded in the first quarter portion of the cassette tape. Since all the general data is recorded in the first quarter portion, it can be easily accessed. If the general data, video data, and audio data are recorded in a mixed condition in the longitudinal direction of the tape, it will take a long time to access the general data. Thus, the download process time of the data becomes long. Since the total amount of data that can be recorded on the tape is very large, a predetermined part thereof is downloaded to the memory.

The video data and the audio data are recorded after the first quarter portion of the tape. Thus, when the video data and the audio data are recorded before the general data, the tape should be travelled to their positions corresponding to for example a counter value. In this case, depending on the tape travelling accuracy, the record start position of the video data and the audio data may vary. To compensate the variation of the video data and the audio data, a guard area is disposed between the record area of the general data and the record area of the other data, which is the video data and the audio data. It should be noted that the general data may be recorded at the fourth quarter portion of the tape.

As is clear from the above-described track format, at the beginning of the track, the audio area is formed. The general data may be recorded in the audio area.

In the digital CATV system shown in FIG. 1, general data may be received along with continuous data such as video data and audio data. The data type is designated corresponding to a code contained in each packet ID. When the mechanism controller 45 shown in FIG. 4 determines that received and selected data is continuous data corresponding to the information of the ID portion, it controls the tape head mechanism portion 20 so that the data record area becomes continuous data record area. When the selected data is general data, the mechanism controller 45 moves the record position to the general data record area, which is the beginning or the end of the tape.

Figure 10:
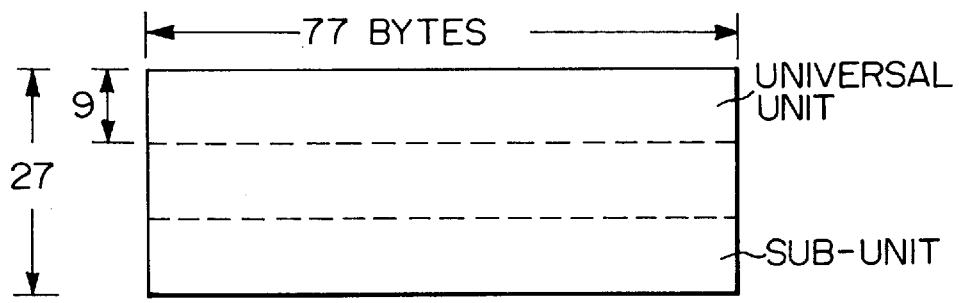
FIG. 10 is a schematic diagram for explaining a basic unit of data construction of the general data.

Next, the record format of the general data will be described. As shown in FIG. 10, a basic unit is constructed by vertically forming 27 blocks. This basic unit is referred to as a universal unit. Although the universal unit contains general data that is composed of 2079 bytes, dummy data may be added so that the general data is composed of 2048 bytes for easy data handling. By dividing the universal unit by 3, nine SYNC blocks are obtained, each of which is referred to as a sub-unit.

Figure 11:
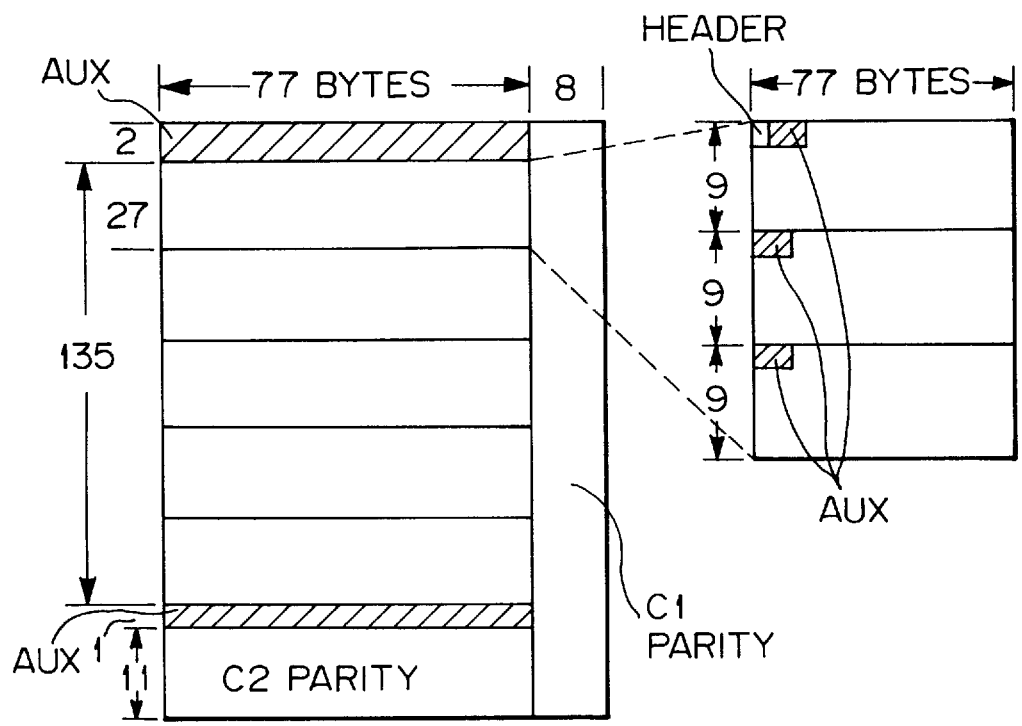
FIG. 11 is a schematic diagram for explaining an example of data construction of the general data.

As shown by hatched portions of FIG. 11, AUX data of two SYNC blocks is placed above the universal unit and AUX data of one SYNC block is placed below the universal unit. 77 horizontal bytes of the resultant universal unit are encoded corresponding to (85, 77) Reed Solomon code and thereby an 8-byte inner-code parity (C1 parity) is formed. 138 vertical bytes of the universal unit are encoded corresponding to (249, 138) Reed Solomon code and thereby an 11-byte outer-code parity (C2 parity) is formed.

Figure 13:
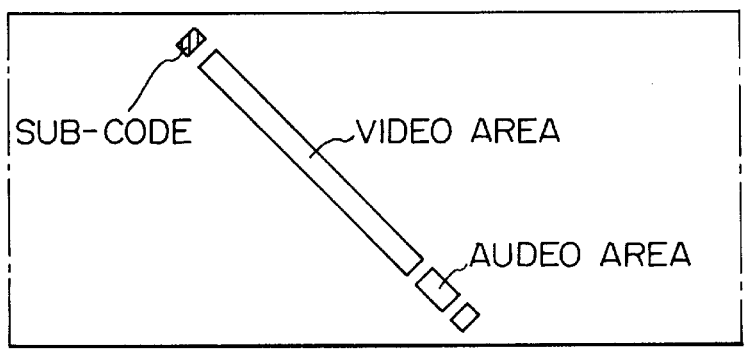
FIG. 13 is a schematic diagram for explaining an example of recording method of the general data.

The general data composed of 27 blocks is divided into sub-blocks, each of which is composed of 9 blocks. In the first sub-unit, a header and AUX data are added to the first block thereof. In each of the other sub-units, AUX data is added to the first block thereof. The data construction shown in FIG. 11 is the same as that of video data shown in FIG. 6. Thus, as shown in FIG. 13, the general data can be recorded in the video area on one track formed on the magnetic tape in the same manner as video data.

Figure 12:
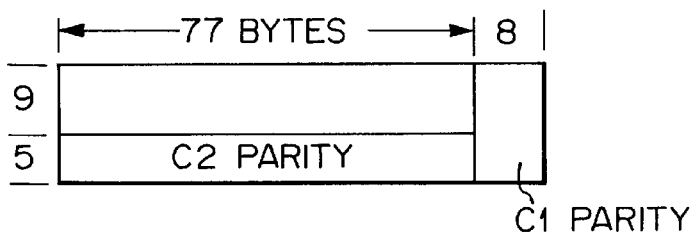
FIG. 12 is a schematic diagram for explaining another example of data construction of the general data.

As shown in FIG. 12, the general data is recorded in the audio area as sub-units. 9 blocks are vertically formed. 77 horizontal bytes are encoded corresponding to (85, 77) Reed Solomon code and thereby an 8-byte inner-code parity (C1 parity) is formed. In addition, 9 vertical bytes are encoded corresponding to (14, 9) Reed Solomon code and thereby a 5-byte outer-code parity (C2 parity) is formed. If necessary, the first five bytes of each block is used as an AUX data area. The data construction shown in FIG. 12 is the same as that of the audio data shown in FIG. 8. Thus, the general data can be recorded in the audio area at the beginning of the track.

Figure 14:
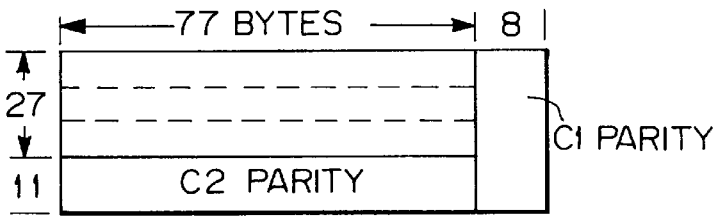
FIG. 14 is a schematic diagram for explaining another example of data construction of the general data.
Figure 15:
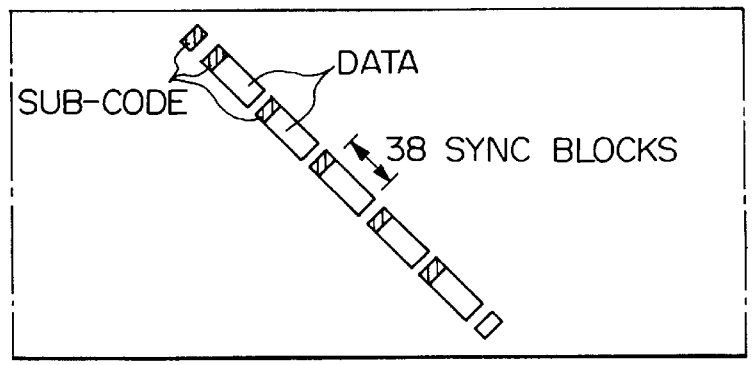
FIG. 15 is a schematic diagram for explaining another example of recording method of the general data.

It should be noted that the general data may be recorded corresponding to multi-track recording system in which one track is divided into several portions. The universal unit in which 27 blocks are vertically formed as shown in FIG. 14 is encoded corresponding to inner-code and outer-code. This data construction (which is composed of 38 blocks) is recorded corresponding to the multi-track system. For example, as shown in FIG. 15, one track is divided into four portions so that guard areas are disposed between each divided track. The general data is recorded in each divided track. In this case, sub-code areas that are shown as hatched portions in FIG. 15 are added to the divided tracks.

As described above, since the general data is recorded on the tape as universal units, the frame segmenting process and the error correction code encoding process can be shared with those for video data and audio data. In the case of the general data, unlike with the case of the video data and audio data, an error of the general data cannot be corrected by interpolating process. Thus, the general data is preferably encoded with stronger error correction code. However, in this case, the benefit of sharing of the processes for the video data and audio data should be maintained. Next, based on such consideration, the improvement of the error correction capability will be described with reference to FIGS. 16A, 16B and 16C.

Figure 16A:
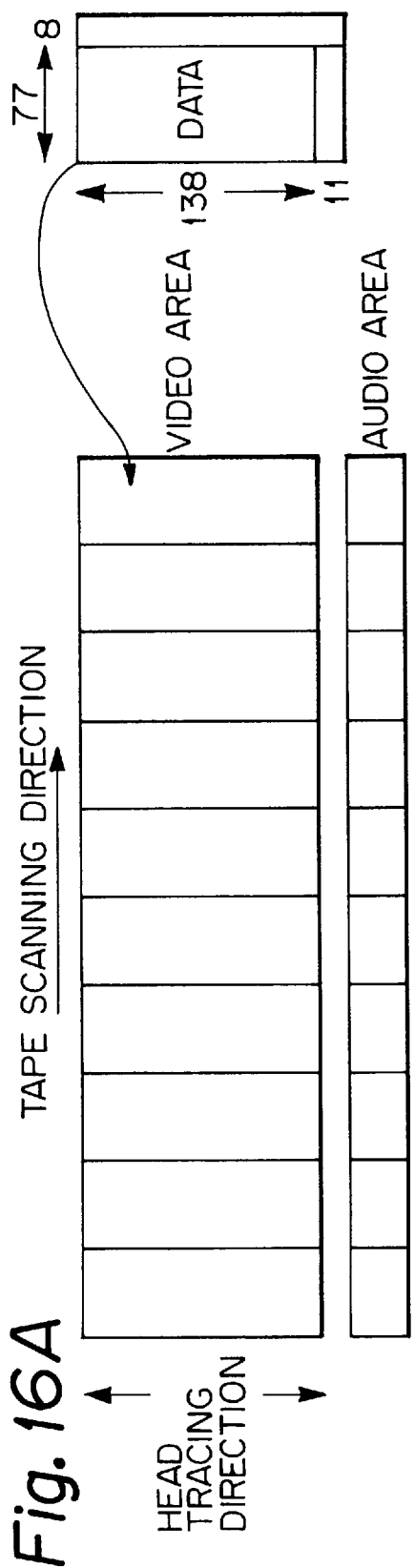
FIGS. 16A, 16B and 16C are schematic diagrams for explaining examples of error correction code encoding for the general data.

FIG. 16A shows 10 tracks of the general data that has been recorded in the video area and the audio area shown in FIG.

Figure 16B:
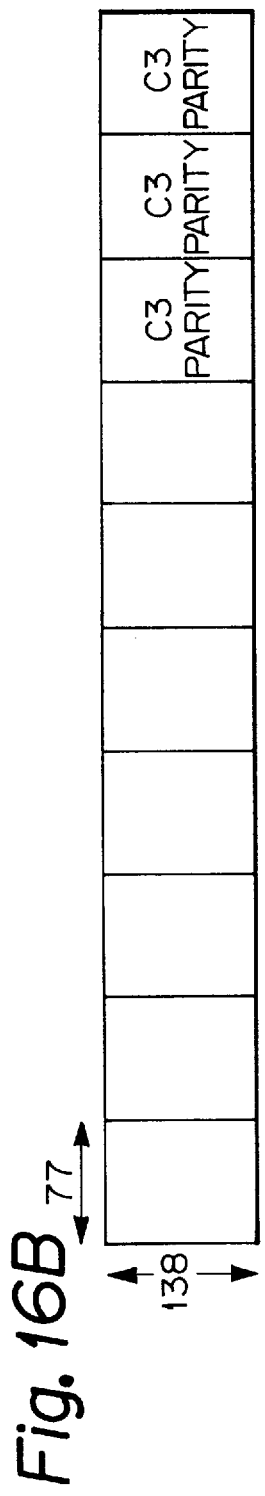
Figure 16C:
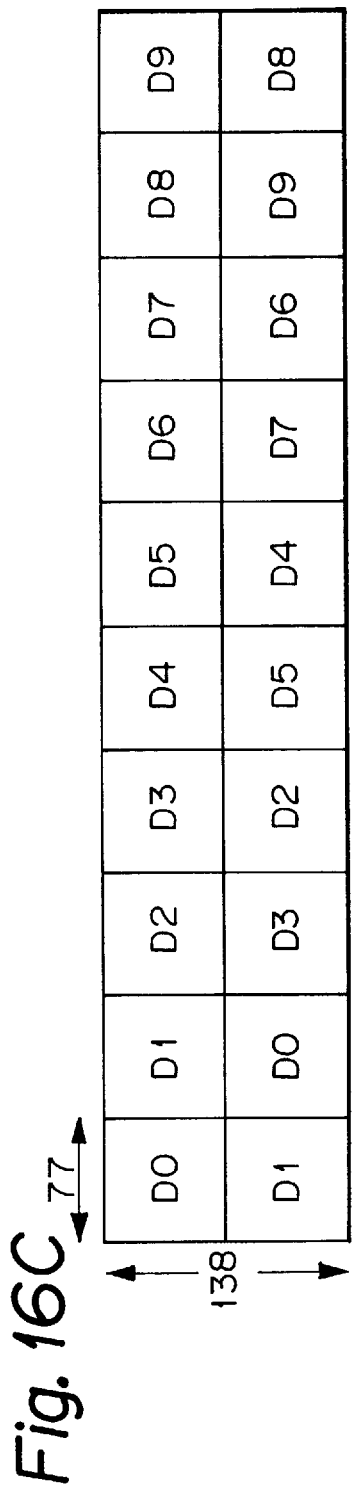

13. In FIGS. 16A, 16B, and 16C, inclined tracks are represented as vertical tracks. As shown in FIGS. 16A, 16B and 16C, in the video area, the general data is recorded in the data construction shown in FIG. 11. In the audio area, the general data is recorded as shown in FIG. 12. 10 tracks are required to record one frame of video data.

A third error correction code encoding is performed for every 10 tracks as one code unit. As shown in FIG. 16B, seven tracks that are firstly traced are used for recording the general data. The remaining three tracks are used for recording the third parity (C3 parity). In reality, bytes that are present at the same positions in the data arrangement of the general data or the AUX data other than the C1 and C2 parities are extracted from the seven tracks. The extracted seven bytes are encoded corresponding to (10, 7) Reed Solomon code. The 3-byte C3 parity is recorded at corresponding positions of the three tracks. As shown in FIG. 16B, according to the method in which the third error correction code is added, even if all data of one track has errors, the errors can be corrected. In addition, as with the case of the data, the C1 parity and the C2 parity can be encoded corresponding to error correction code.

FIG. 16C explains another method for improving error correction capability. In this method, general data is dually recorded. The same general data is recorded on every adjacent two tracks. The general data that is recorded on one track is divided into two data portions $D_i$ and $D_{i+1}$. The first divided data Di is recorded on the first half of a former track and on the second half of a latter track. The second divided data $D_{i+1}$ is recorded on the second half of the former track and on the first half of the latter track. For example, the divided data $D_0$ is recorded on the first half of the former track and on the second half of the latter track. On the other hand, the other divided data $D_1$ is recorded on the second half of the former track and on the first half of the latter track. Since the general data is dually recorded, by collating two parts of the general data, an error can be corrected. The method shown in FIG. 16C can improve the error correction capability in the case that scratches are present in the longitudinal direction of the tape.

As described above, in the system shown in FIG. 1, the data rate of image data received by the terminal apparatus 6 is not constant. The data rate of the image data depends on the program channel. When the statistical bit allocation process has been performed, on the same program channel, the data rate varies. This rate information is included in the image data being transmitted. The rate information is placed in for example the ID portion. When the statistical bit allocation process has been performed, for example the maximum value of the data rate is transmitted as rate information. The rate detecting circuit 43 detects the rate information. The mechanism controller 45 receives the detected rate information and controls the buffer memory 46 and the tape head mechanism portion 20. Thus, the mechanism controller 45 can record image data with different data rates on the tape.

The standard data rate of data recorded by the tape head mechanism portion 20 is for example 25 Mbps. However, this is the data rate of compressed image data that has not been recorded. Since data is recorded on the tape along with other data and they are channel-modulated, the data rate of data recorded on the tape is approximately 44 Mbps. When image data with data rate less than 44 Mbps is recorded, the image data can be recorded as data with data rate of 25 Mbps. When data with data rate of for example (25/3) Mbps, the data rate can be converted by the buffer memory and the resultant data can be recorded on the tape that travels at the standard speed (18.8 mm/sec) by the rotating head with the standard rotating speed (9000 rpm). However, in this case, as insufficient data, invalid data such as "0" is recorded and thereby ⅔ of the magnetic tape are wastefully used. To prevent the tape from being wastefully used, according to the present invention, data is recorded at lower data rate than the standard data rate.

When a cassette tape in which data has been recorded is removed from the terminal apparatus and the data of the cassette tape is reproduced by the digital VCR, the track format of the cassette tape is preferably the same as the format of data that is recorded at the standard data rate. In other words, the track format of the cassette tape is preferably the same as the track format shown in FIG. 5. In addition, the record wavelength (shortest wavelength) of the cassette tape is preferably the same as that of standard data. Moreover, although not always necessary, the inclined angles of the tracks on the tape are preferably the same as those of standard data.

Next, some examples that satisfy the above-mentioned conditions will be described with reference to a timing chart shown in FIGS. 17A, 17B, 17C and 17D. In the following examples, the tape head mechanism portion 20 has a pair of rotating heads that are disposed at opposed intervals of 180°. FIG. 17A shows 150 Hz switching pulses that synchronize with the rotations of the drum. FIG. 17B shows data at 25 Mbps that is recorded alternatively by the rotating heads. In other words, while the signal level of the switching pulses is high, one of the heads records data. While the signal level of the switching pulses is low, the other head records data. The following examples can be applied to the data rate of 1/M. As an example, assuming that M is 3, these examples will be described.

In a first recording system, the number of rotations of the drum and the tape speed are ⅓ those of the standard recording system. As shown in FIG. 17A, the frequency of the switching pulses is 50 Hz. In the first recording system, the track format on the tape is the same as that of the standard recording system. The inclined angle of the tracks in the first recording system is also the same as that of the standard recording system. However, the track pitches of this recording system is different from those of the standard recording system. The timing of the recording process in the first recording system is ⅓ that of the standard recording system.

In a second recording system, the number of rotations of the drum is the same as that of the standard recording system (namely, 9000 rpm). The tape speed of the second recording system is ⅓ that of the standard recording system. Thus, as shown in FIG. 17B, the frequency of the switching pulses of the second recording system is 150 Hz. Data that has been converted from 25 Mbps/3 to 25 Mbps by the buffer memory is intermittently recorded. As shown in FIG. 17B, after one rotating head forms one track, it stops recording during the next switching pulse period. While the rotating head stops recording, the other rotating head forms the next track and records data.

With such intermittent recording, image data can be recorded with data rate ⅓ as low as that of the standard track format. However, in the second recording system, the relative speed between the heads and the tape is different from that in the standard recording system. Thus, the inclined angle of the tracks in the second recording system is different from that in the standard recording system. In addition, to perform the inclined azimuth recording (azimuth angles of adjacent tracks differ from each other), the ratio M should be an odd number.

Figure 18A:
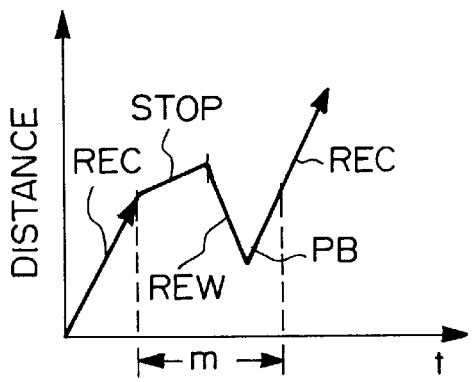
FIGS. 18A and 18B are schematic diagrams for explaining several methods for recording data at low rate.

In the first and second recording systems, the tape is travelled at low speed corresponding to the ratio. However, in a third recording system and a fourth recording system, the tape speed and the number of rotations of the drum are the same as those in the standard recording system so that the tape is intermittently travelled. In the third recording system, as shown in FIG. 18A, while the tape is travelled at standard speed, for example 10 tracks are recorded (REC). Thereafter, the tape is stopped (STOP). The tape is slightly rewound (REW). Then, data is reproduced from the tape (PB). Thus, newly recorded data is continued to tracks on which data has been recorded. This recording system is referred to as pre-roll system. The record stop period is denoted by m. The data rate of the record data is 25 Mbps, which has been converted from 25/3 Mbps. By such intermittent recording, the average data rate becomes 25/3 Mbps. In the third recording system, the track format and the inclined angle of the tracks are the same as those in the standard recording system.

Figure 18B:
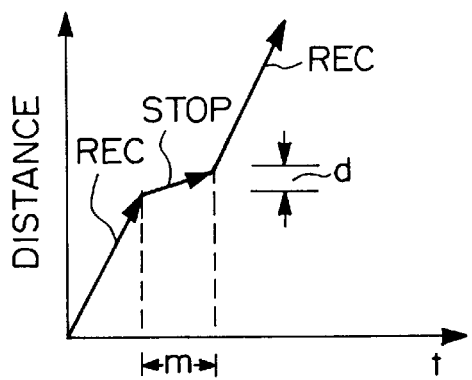

As shown in FIG. 18B, in the fourth recording system, the tape feed is stopped for a period of m without the rewind operation. For example, after 10 tracks have been recorded, the recording operation is stopped for a period of m. In the fourth recording system, the data rate of the record data is 25 Mbps, which has been converted. The average data rate is 25/3 Mbps. The track format of the fourth recording system is the same as that of the standard recording system. The inclined angle of the tracks and the track pitches of the fourth recording system may differ from those of the standard recording system. In the fourth recording system, even if the tape is stopped, it is slightly travelled. Thus, a guard band with a width of d corresponding to the amount of travelling of the tape takes place.

The recording operations of the third and fourth recording systems in which the tape traveling and recording are intermittently performed are represented with a timing chart shown in FIG. 17C. Upper two timing charts of FIG. 17C show that data at 25 Mbps is recorded by two rotating heads. Lower two timing charts of FIG. 17C show that time axis of data is compressed.

Figure 19:
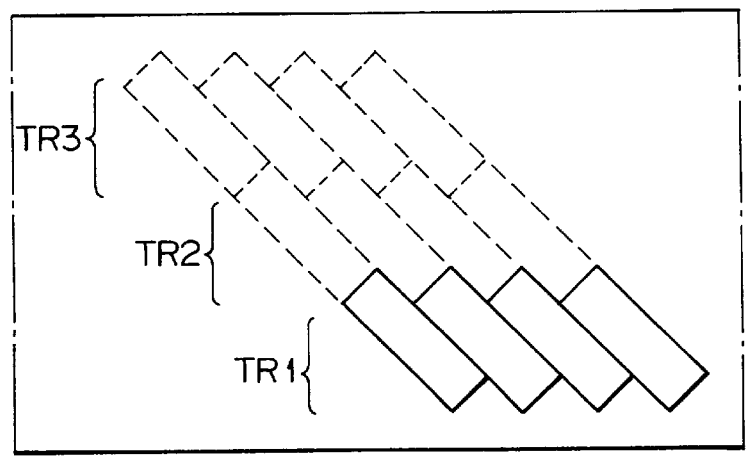
FIG. 19 is a schematic diagram for explaining another example of recording method of data at low rate.

A fifth recording system is a multi-track system. As shown in FIG. 19, at the data rate of 25/3 Mbps, each track is divided into three portions that are divided tracks TR1, TR2, and TR3. A first recording operation is performed for the divided tracks TR1. While the head is tracing the divided tracks TR2 and TR3, data is not recorded on the divided tracks TR1. After data has been recorded on all the divided tracks TR1 of all the tape, data is recorded only on the divided tracks TR2 from the beginning of the tape. After data has been recorded on all the divided tracks TR2, data is recorded on only the divided tracks TR3. In the fifth recording system, the tape feed speed and the number of rotations of the drum are the same as those of the standard recording system. In addition, data that has been compressed on the time axis is recorded at the data rate of 25 Mbps.

FIG. 17D shows a timing chart of the recording operation for the divided tracks TR1 in the multi-track system. As an average, data at the data rate of 25/3 Mbps is recorded. In the fifth recording system, the inclined angle of the tracks and the track pitches are the same as those in the standard recording system. However, the track format in the fifth recording system is different from that in the standard recording system.

In the above-described first to fifth recording systems, when a cassette tape that records data for one hour at the standard data rate is used, the cassette tape can record data for three hours that are three times longer than the record time at the standard data rate. Thus, the cassette tape can be effectively used.

Next, a system for reproducing data from a tape in which data has been recorded corresponding to one of the above-described first to fifth recording systems will be described. In the first recording system, the rotating speed of the drum and the tape travelling speed are ⅓ those in the standard recording system. Data of each track is reproduced by tracking servo mechanism. Data that has been recorded on a tape corresponding to the second recording system is reproduced with the number of rotations of the drum and the tape speed that are the same as those in the recording mode without tracking control. This technique is referred to as non-tracking reproduction. In the non-tracking reproduction, a SYNC block with a correct ID is stored in the memory. The address where the SYNC block is stored is represented by the ID. In the non-tracking reproduction method, the tracking servo control is not used. A tape in which data has been recorded in the first recording system can be reproduced corresponding to the non-tracking system.

When a tape in which data has been recorded corresponding to the third recording system is intermittently travelled, data can be reproduced with the tracking servo control. In addition, when the timing speed in the reproducing mode is ⅓ that in the recording mode, data can be reproduced corresponding to the non-tracking system. Data that has been recorded on a tape corresponding to the fourth recording system can be reproduced corresponding to the non-tracking system. When data has been recorded on a tape corresponding to the fifth recording system, with the tracking servo control, reproduced data of each divided track is separated in the same manner as the recording mode.

Figure 20:
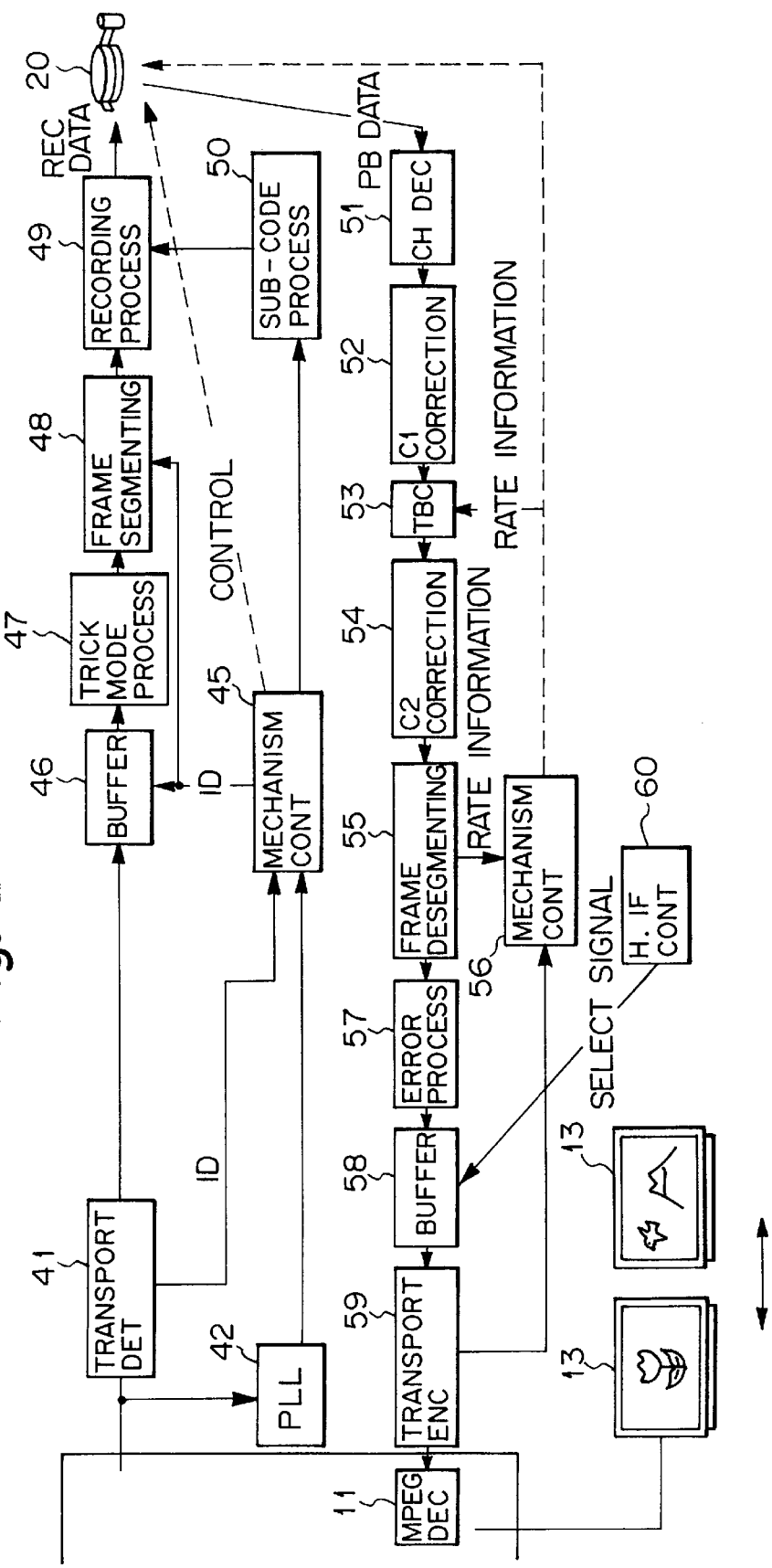
FIG. 20 is a block diagram of multi-program recording according to another embodiment of the present invention.

FIG. 20 shows a second embodiment of the present invention. According to this embodiment, in the digital CATV system, if the data rate of received multi-channel time-division multiplexed data is approximately 25 Mbps, the time-division multiplexed data is recorded by the tape head mechanism portion 20. The same portions as those shown in FIG. 4 are denoted by the same reference numerals. In the construction in which a multi-program is recorded, the transport detecting circuit 41 receives time-division multiplexed data in the same manner as the construction shown in FIG. 4. The transport detecting circuit 41 detects an ID that is added to each packet. The ID includes an ID that has been recorded in the multi-program, an ID that represents the data rates of programs being recorded, and titles thereof.

The ID is placed in the video AUX area by a frame segmenting circuit 48 as with the above-described first embodiment and the ID is recorded on the tape. When data is reproduced from the tape, the ID of the multi-program is read. The reproducing data rate of the tape head mechanism portion 20 is set to the normal reproducing rate. With the detected rate information, the TBC 53 and the buffer memory 57 are controlled so as to obtain reproduced signals. In other words, in the second embodiment, since the data rate of the time-division multiplexed data is the same as that of the standard recording system, data can be recorded on the tape with the same process as the standard recording system.

A program channel to be reproduced is selected by the user. In this case, a select signal is supplied from a human interface controller 60 to a buffer memory 58. The buffer memory 58 supplies data of only the selected program channel to an MPEG decoder 11 through a transport encoder 59. A monitor 13 displays an image of the program channel that has been selected by the user.

In the multi-program recording system, all programs that are transmitted in a particular time period can be recorded on the tape. Thus, the user can see his or her desired program.

Figure 21:
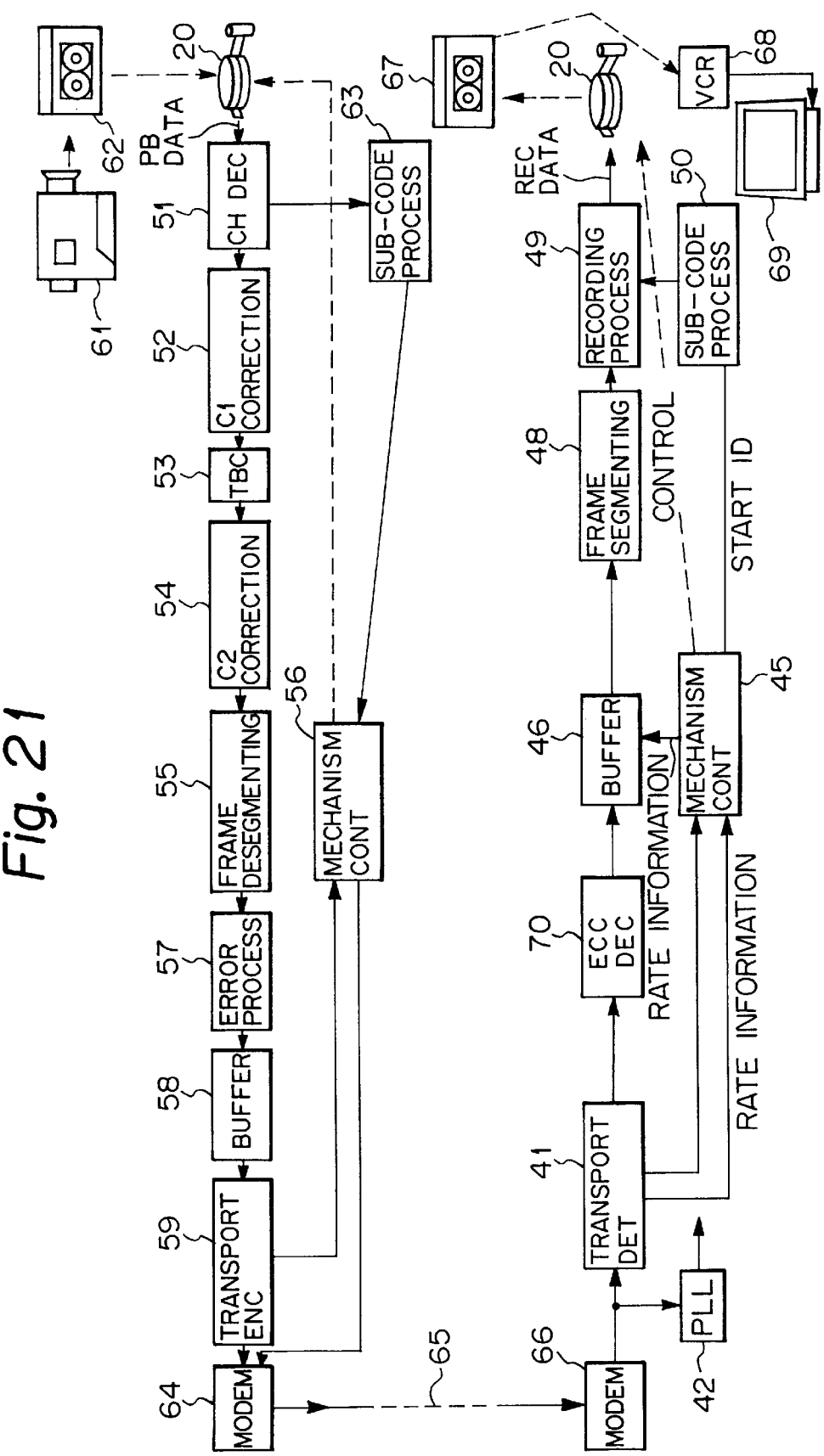
FIG. 21 is a block diagram of electronic-mail according to further embodiment of the present invention.

Next, with reference to FIG. 21, a third embodiment of the present invention will be described. The system shown in FIG. 21 is a kind of an electronic mail system. Data photographed by for example a video camera 61 with a digital VCR is transmitted to a party through a low speed line such as a telephone line.

Data that has been photographed and recorded by the video camera 61 is reproduced by a tape head mechanism portion 20. The data rate of the reproduced data is 25 Mbps, which is the data rate of the standard recording system. Thereafter, data is reproduced through a channel demodulating circuit 51, a C1 correction circuit 52, a TBC 53, a C2 correction circuit 54, and a frame desegmenting circuit 55. An output signal of the frame desegmenting circuit 55 is supplied to an error process circuit 57 so as to encode the data with error correction code against a transmission error. The reproduced data, which is output from the channel demodulating circuit 51, is supplied to a sub-code process circuit 63. The sub-code process circuit 63 performs sub-code process.

An output signal of the error correction code 57 is supplied to a buffer memory 58. The buffer memory 58 converts the data rate for example from 25 Mbps to 1.5 Mbps. In other words, the buffer memory 58 expands the time axis of the data. An output signal of the buffer memory 58 is supplied to a transport encoder 59. An output signal of the transport encoder 59 and rate information supplied from the mechanism controller 56 (information that represents the data rate of data to be transmitted, for example, 1.5 Mbps) is supplied to a modem 64. These pieces of data are supplied to the party through a low speed telephone line 65. To designate the party, the dial operation is performed.

The low speed data received through the telephone line 65 is supplied to a terminal apparatus of the party (shown by a lower portion of FIG. 21). These pieces of data are recorded on a magnetic tape by a tape head mechanism portion 20. To record the low speed data, the above-described embodiments of the present invention can be applied.

In other words, a transport detecting circuit 41 is connected to the modem 66. The detected rate information is supplied to a mechanism controller 45. The mechanism controller 45 controls the operation of the tape head mechanism portion 20 so that data at for example 1.5 Mbps is recorded on the tape with the same track format as the standard recording system.

The construction of the recording system is the same as that shown in FIG. 4. However, to more strongly protect data against an error that takes place on the communication line, an error correction decoder 70 is provided corresponding to an error process circuit 57 (on the transmission side) that encodes data with error correction code. As a method for recording data at low data rate, one of the first to fifth recording systems can be used.

According to the present invention, data on a cassette tape 67 is recorded with a low data rate corresponding to one of such recording systems. Thus, the cassette tape 67 that has recorded such data is unloaded from the terminal apparatus and data recorded on the cassette tape 67 is reproduced by the digital VCR. The reproduced image can be displayed on the monitor 69.

According to the present invention, when data at lower rate than that of standard data is input, the input data can be recorded with the same track format as that of the standard data rate. In addition, according to the present invention, since the recording operation is controlled, the tape is not wastefully used. Moreover, according to the present invention, the process and hardware that are used for recording data at standard data rate can be shared with those for recording data at low data rate.

According to the present invention, since general data is recorded in a leading portion or a trailing portion of a tape, it can be easily accessed. In addition, since the data structure of the general data is the same as that of the video data, error correction code encoding process, frame segmenting process, and so forth for the general data can be shared with those for the video data. Thus, the processes and hardware can be simplified. Moreover, according to the present invention, since the data structure of sub-units into which basic units are divided is the same as that of PCM audio data, the process and hardware thereof can be shared with those of the audio data.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A digital recording method for inputting, from a transmitted broadcast signal, both continuous data including audio/video data and general data including a computer program but not audio/video data that is non-continuous data and for recording an input digital signal on a tape-shaped recording medium having a leading end and a trailing end, wherein said general data is transmitted and input intermittently, comprising the steps of:

determining that the input digital signal is the general data that is non-continuous, determining a general data recording area that is at least one of a leading portion and a trailing portion, the leading portion extending from the leading end of the tape-shaped recording medium for a predetermined length, the trailing portion extending to the trailing end of the tape-shaped recording medium for a predetermined length, and recording the general data in the general data recording area; and determining that the input digital signal is the continuous data, determining a continuous data recording area other than the general data recording area of the tape-shaped recording medium, and recording the continuous data in the continuous data recording area.

2. A digital signal recording apparatus, comprising:

a first signal process path for inputting, from a transmitted broadcast signal, both continuous data including audio/video data and general data including a computer program but not audio/video data that is non-continuous, wherein said general data is transmitted and input intermittently, said first signal process path including demodulating means for demodulating the input digital signal, means for decoding the demodulated signal, and means for outputting the decoded signal to an output device;

a second signal process path disposed downstream of said demodulating means of said first signal process path and including modulating means for modulating the demodulated signal, encoding the modulated signal with error correction code, and recording the encoded data on tracks of a tape-shaped recording medium having a leading end and a trailing end;

data determining means for determining whether the input digital signal is the general data or the continuous data; and control means for determining a general data recording area that is at least one of a leading portion and a trailing portion of a track, the leading portion extending from the leading end of the tape-shaped recording medium for a predetermined length, the trailing portion extending to the trailing end of the tape-shaped recording medium for a predetermined length, said control means controlling the recording of the general data in the general data recording area when said data determining means has determined that the input digital signal is the continuous data and for determining a continuous data recording area other than the general data recording area of the tape-shaped recording medium to control the recording of the continuous data in the continuous data recording area when said data determining means has determined that the input digital signal is the continuous signal.

3. The digital signal recording apparatus as set forth in claim 2, further comprising a rotating head for recording the encoded data in inclined tracks on the tape-shaped recording medium, the encoded data being composed of SYNC blocks with a predetermined length, and wherein the general data is recorded in such a manner that the number of the SYNC blocks contained in one of the tracks in which the continuous data is recorded is divided into an integer number of basic units and additional data is placed in each of the basic units.

4. The digital signal recording apparatus as set forth in claim 2, further comprising a rotating head for recording the encoded data in inclined tracks on the tape-shaped recording medium, the encoded data being composed of SYNC blocks with a predetermined length, and wherein the general data is recorded in such a manner that the number of the SYNC blocks contained in one of the tracks in which the continuous data is recorded is divided into an integer number of basic units and the basic units are divided into an integer number of sub-units and additional data is placed in each of the sub-units.

5. The digital signal recording apparatus as set forth in claim 2, further comprising a rotating head for recording the encoded data in inclined tracks on the tape-shaped recording medium, the encoded data being composed of SYNC blocks with a predetermined length, and wherein the general data is recorded in such a manner that the number of the SYNC blocks contained in one of the tracks in which the continuous data is recorded is divided into an integer number of basic units and the basic units are divided into an integer number of sub-units and additional data is placed in each of the sub-units and the general data is recorded in an audio data recording area of the track.

6. The digital signal recording apparatus as set forth in claim 2, wherein a guard area is formed between the general data recording area and the continuous data recording area.

* * * * *